United States Patent [19]
Spiegel et al.

[11] Patent Number: 5,272,428
[45] Date of Patent: Dec. 21, 1993

[54] FUZZY LOGIC INTEGRATED CONTROL METHOD AND APPARATUS TO IMPROVE MOTOR EFFICIENCY

[75] Inventors: Ronald J. Spiegel, Chapel Hill; Paul J. Chappell, Raleigh, both of N.C.

[73] Assignee: The United States of America as represented by the U.S. Environmental Protection Agency, Washington, D.C.

[21] Appl. No.: 840,483

[22] Filed: Feb. 24, 1992

[51] Int. Cl.$^5$ .............................................. H02P 5/40
[52] U.S. Cl. ................................... 318/803; 318/807; 318/811; 364/431.07
[58] Field of Search ....................... 364/426.01, 426.02, 364/426.04, 424.1, 431.07; 318/811, 805, 803, 807, 809, 799, 798, 800

[56] References Cited

U.S. PATENT DOCUMENTS

| | | | |
|---|---|---|---|
| 4,694,418 | 9/1987 | Ueno et al. | 364/807 |
| 4,716,540 | 12/1987 | Yamakawa | 364/807 |
| 4,788,485 | 11/1988 | Kawagishi et al. | 318/807 |
| 4,800,327 | 1/1989 | Fujioka et al. | 318/811 |
| 4,809,175 | 2/1989 | Hosaka et al. | 364/424 |
| 4,864,490 | 9/1989 | Nomoto et al. | 364/157 |
| 4,884,216 | 11/1989 | Kuperstein | 364/513 |
| 4,905,135 | 2/1990 | Unehara et al. | 318/811 |
| 4,914,924 | 4/1990 | Takahashi | 62/133 |
| 4,930,084 | 5/1990 | Hosaka et al. | 364/426.04 |
| 5,001,640 | 3/1991 | Matsumoto et al. | 364/426.02 |
| 5,012,430 | 4/1991 | Sakurai | 364/513 |
| 5,021,958 | 6/1991 | Tokoro | 364/426.04 |
| 5,095,435 | 3/1992 | Takoro et al. | 364/424.1 |

FOREIGN PATENT DOCUMENTS 3-18397  1/1991  Japan .

OTHER PUBLICATIONS

"Designing With Fuzzy Logic" by Kevin Self, pp. 42–44, 105; IEEE Spectrum, Nov. 1990.

*Primary Examiner*—William M. Shoop, Jr.
*Assistant Examiner*—John W. Cabeca
*Attorney, Agent, or Firm*—Irving M. Freedman

[57] ABSTRACT

The power efficiency of an electric motor driven load including an adjustable speed drive is improved through use of a fuzzy logic controller to provide a power efficiency signal. A fuzzy rule base controls sequential power changes based on a determination of the effect of previous changes to meet load demands on a reduced power input basis.

40 Claims, 5 Drawing Sheets

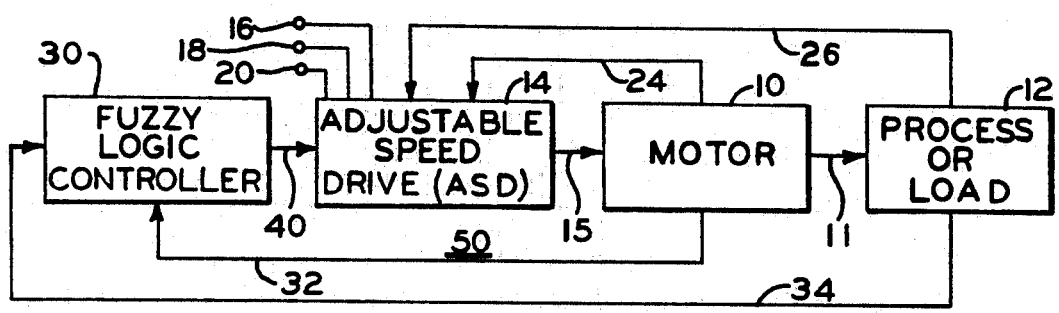
FIG_1
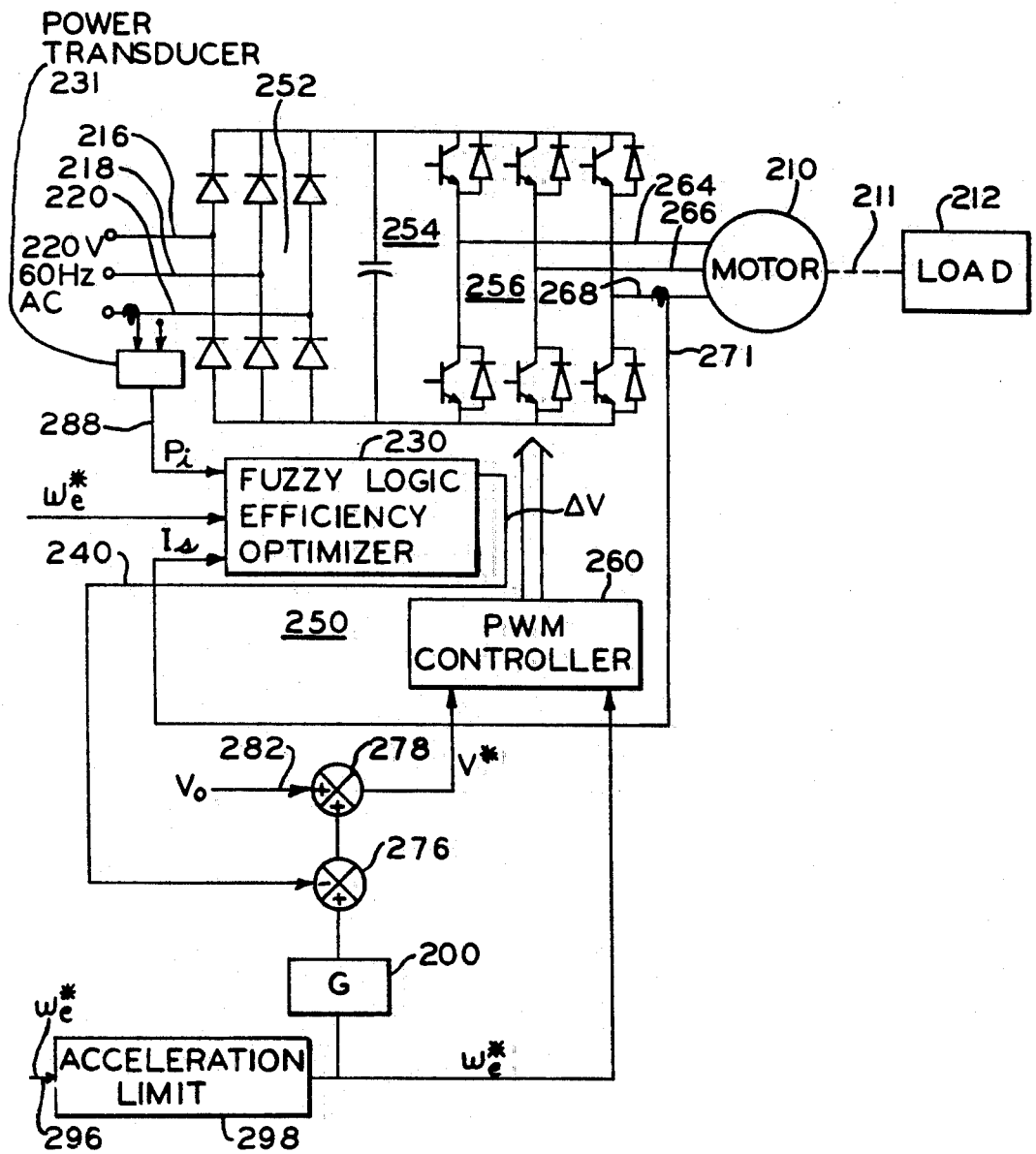
FIG_2

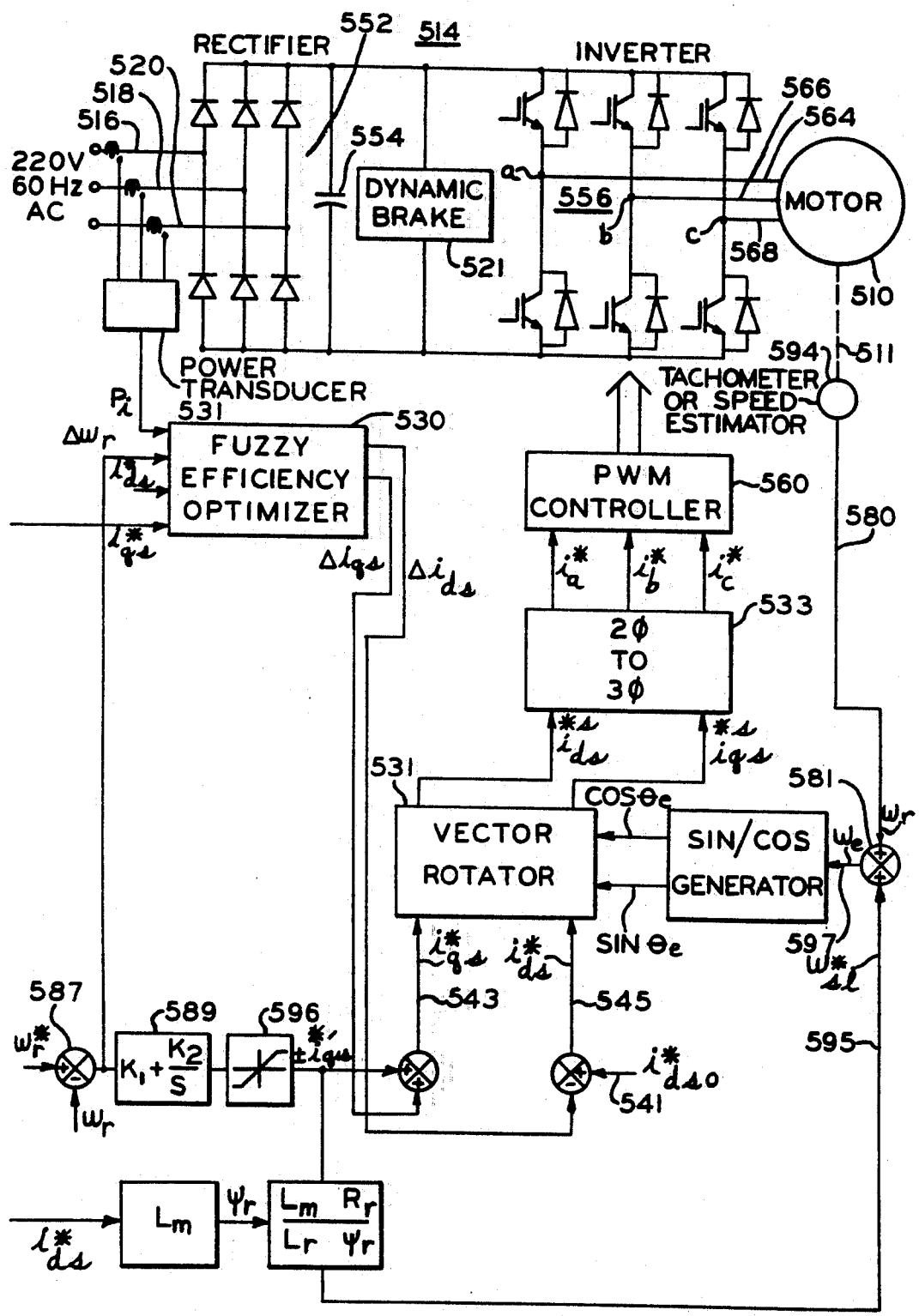
FIG_5

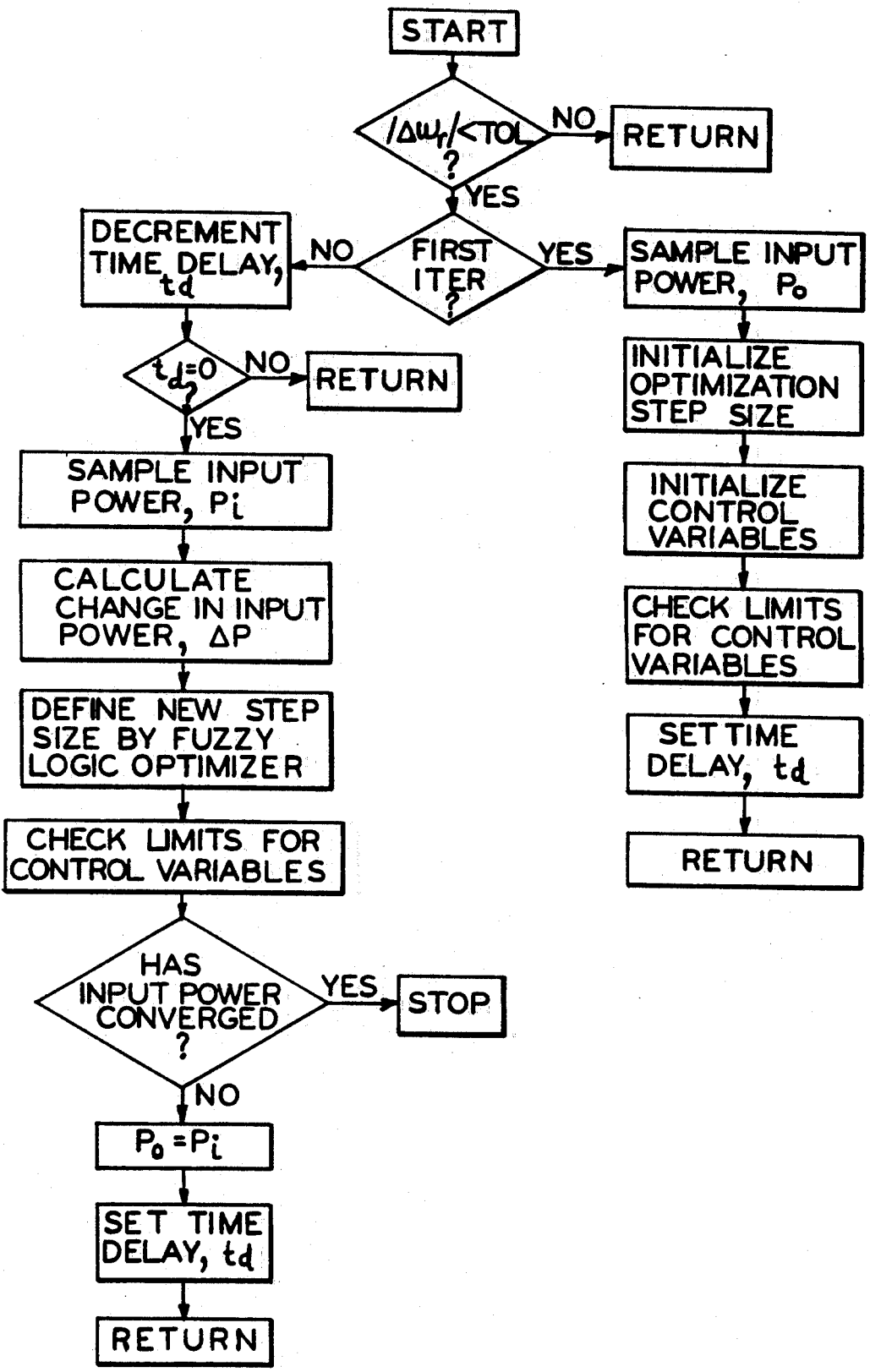
FIG_6

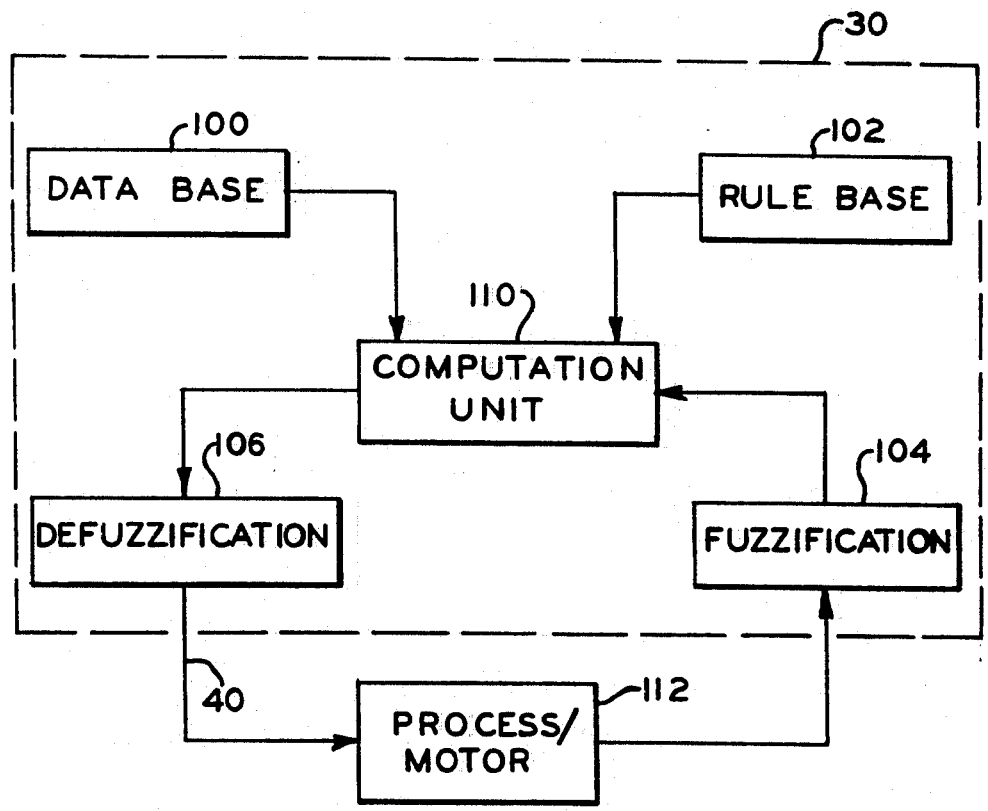

FUZZY LOGIC INTEGRATED CONTROL METHOD AND APPARATUS TO IMPROVE MOTOR EFFICIENCY

BACKGROUND OF INVENTION

The present invention relates to the use of fuzzy logic integrated intelligent control to improve the efficiency of electric motors.

It is estimated that over 60 percent of the electricity generated in the U.S. is consumed by electric motors. Since the principal energy source for the generation of electricity in the United States and worldwide is through use of the combustion of fossil fuels, a reduction of electric power consumption can result in a significant decrease in the combustion of fossil fuels and a significant reduction in the release into the atmosphere of sulfur dioxide ($SO_2$) and carbon dioxide ($CO_2$), major atmospheric pollutants resulting from such combustion. It is believed that $SO_2$ and nitrogen oxides ($NO_x$), contribute to acid rain and $CO_2$ contributes to the greenhouse effect and potential global climate change. A reduction in these emissions can improve air quality and decrease the environmental damage to lakes, rivers, and trees. Increasing the efficiency of electric motors will also reduce the cost of the end-use processes driven by the electric motors which can in turn lead to the reduction in the cost of manufacturing goods and providing services. Thus, reductions in the use of electric power can result in significant economic savings and environmental improvements.

Conventional motor controls are primarily directed at varying the motor speed to match the varying load requirements through the use of an adjustable speed drive (ASD). However, varying the speed of an electric motor to match or meet the load-requirements does not necessarily operate the motor at maximum power efficiency. Load/speed motor control with superimposed efficiency control is difficult to accomplish. Moreover, it is desirable to be able to readily modify or retrofit existing motors with a control arrangement which will provide, or improve, power efficiency. One reason that conventional electric motor speed control systems do not necessarily optimize power efficiency considerations is the control complexity of meeting all of the potential contradictory demands placed upon, and the large number of variables occurring within, such a system.

The present invention utilizes the inherent capabilities of fuzzy logic set theory in an integrated intelligent controller to improve the energy or power efficiency of electric motors, particularly alternating current (AC) induction motors, while at the same time meeting the demands of the process equipment and load operations which are driven by such electric motors. Fuzzy logic has the proven ability to represent complex, ill-defined systems that are difficult or impractical to model and control by conventional methods. In addition, fuzzy logic is a form of artificial intelligence theory which is possible to be implemented in an integrated electronic circuit device or microchip. This ability is important in the case of the modification, or retrofitting, of existing electric motors and related industrial systems, since microchips can be readily added through an add-on circuit board to existing controllers and require little additional electric power for their operation.

The theory of fuzzy logic and an explanation of its ability to be utilized in complex, ill-defined systems, is set forth, for example, in "Designing with Fuzzy Logic" by Kevin Self, pp. 42, *IEEE Spectrum*, November 1990, which article is hereby incorporated by reference. Fuzzy logic has been applied to various complex control systems. Examples include the use of fuzzy logic for determining a target value for the drive torque of a vehicle as set forth in U.S. Pat. No. 5,021,958. U.S. Pat. No. 4,809,175 describes the use of fuzzy logic in a vehicle for the control of speed and other parameters of an internal combustion engine. In Japanese patent JP3-18,397 the voltage and rotational speed of a motor are applied to a fuzzy logic processor in order to prevent an overload of the motor.

There is, thus, a long-standing need to improve the efficiency of electric motors, particularly large industrial motors, through a control system which is relatively inexpensive and capable of addition to existing industrial electric motors and processes through retrofitting, and yet which is equally applicable for incorporation into the design of new motor control systems.

OBJECTS AND SUMMARY OF INVENTION

It is accordingly an object of the present invention to provide an improved arrangement for decreasing the electric power consumption of electric motors.

It is a further object of the present invention to improve the efficiency of electric motors and motor systems, including electric motor systems which include an adjustable speed drive to meet varying load requirements.

It is another object of the present invention to provide an improved electric motor control system which may readily be retrofitted, or integrated into, existing motor control systems in order to improve the efficiency of the existing motor control systems.

It has been estimated that induction motors comprise approximately 70–80 percent of the electric motors used in industrial processes in the United States. It is thus particularly important that the energy efficiency of such motors be improved. Alternating current (or AC) induction motors typically operate at efficiencies in the range of approximately 70 to 90 percent. Such inefficiencies in the AC induction motors result from a plurality of factors, including induction losses or resistive heating of the windings in the stator and rotor, magnetic core losses resulting from stray eddy currents, and hysteresis losses induced by the motor's magnetic fields, friction and windage losses, stray load losses and other variables. It has been estimated that while large electric motors (those greater than 5 horsepower) constitute less than 2 percent of the number of electric motors in use in the United States, they consume 90 percent of the electric power consumed by electric motors, and that while very large motors (those greater than 20 horsepower) constitute less than 1 percent of the motors used in the United States, they consume over 80 percent of the electric power consumed by electric motors in the United States. The ability to improve the power efficiency of such large motors is thus particularly important.

It has been further estimated that each 1 percent improvement in motor efficiency could result in significant economic savings including the saving of some 17 billion kilowatt hours of electricity each year, which would otherwise require the combustion of as much as 10 million tons of coal per year, which in turn would cost some $1 billion and release up to 20 millions tons of CO2 and SO2 per year into the earth's atmosphere.

Accordingly, there exists great potential for significant reductions in electric power consumption by improving the efficiency of electric motors, particularly large industrial motors, even if the improvement in efficiency is in what may initially appear to be a modest range of 1 percent to 10 percent. As pointed out above, even a 1 percent increase in power efficiency of such motors can result in considerable energy savings, and prove to be extremely cost effective over a relatively short period of time.

In carrying out the present invention, a fuzzy logic control system is applied to an electric motor control system as an additional input to the automatic adjustable speed drive in order to improve the power efficiency of the system. More particularly, the fuzzy logic controller utilizes a fuzzy rule base to generate a power efficiency signal which minimizes the power input to the motor while meeting the load speed and torque demands. The rule base includes rules such as big, medium and small power change, and the electric motor input is changed in steps until minimum power input to the electric motor is achieved, while meeting the load demands on the electric motor. Variables in the operating characteristics of the electric motor, such as input power, input voltage, input current, and slip may be used for inputs to the fuzzy logic controller, making the system independent of any specific load. Operational variables of the load may be added as inputs to the fuzzy logic controller which may be of solid state configuration and readily retrofitted to existing electric motor automatic speed drives.

DESCRIPTION OF DRAWINGS

FIG. 1 is a general block diagram of a motor control system incorporating the present invention.

FIG. 2 shows details of an open loop control system of FIG. 1.

FIGS. 3-5 are alternate embodiments of FIG. 2 showing closed loop speed control systems with slip and voltage control, with slip and current control, and with indirect vector control, respectively.

FIG. 6 is the fuzzy logic flow chart for the efficiency optimizer of FIGS. 2-5.

FIG. 7A is a basic or fundamental embodiment of a rule base for use i fuzzy logic efficiency optimizer of FIGS. 2-5.

FIG. 7B illustrates another embodiment of the rule base of FIG. 7A.

FIG. 8 shows details of the fuzzy logic controller.

Figure 3:
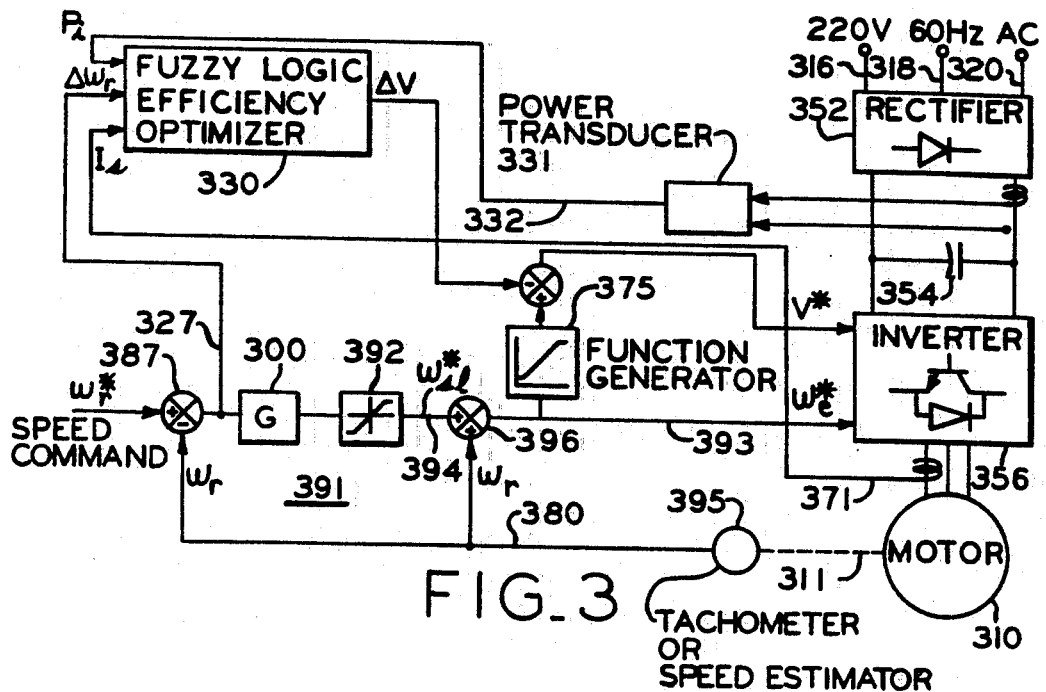

Referring first to FIG. 1. The motor 10, which may be a large horsepower alternating current induction motor, is connected through mechanical coupling 11 to the process or load 12 to which it supplies motive power. The motor 10 is provided with electrical power from the adjustable speed drive (ASD) 14, which in turn obtains electric power from the alternating current (AC) power line terminals 16, 18, and 20, which provide 220-volt AC power. Induction motors such as motor 10 perform over 80 percent of the industrial motor tasks in the United States. Motor 10 performance characteristics, such as power, voltage, current, and/or rotational speed are provided to the adjustable speed drive 14 by the motor feedback 24. Similarly, operational characteristics of the process or load 12 may also be fed back to the adjustable speed drive 14 by process or load feedback 26. The ASD 14, depending on the specific process or load 12 and on other factors, may be of any one of a number of different types, such as a voltage-source invertor, current-source invertor, pulse width modulating, or load commutated invertor. Adjustable speed drives operate on the basic principal of converting the input power provided from the line power terminals 16, 18, and 20 (which may be 50 or 60 cycles with voltages of 230, 460 or higher) from alternating current (AC) to direct current (DC) in a rectifier circuit. The rectified current is then filtered (usually in a capacitor network) and switched, in a circuit such as an invertor circuit, to provide a controllable AC power output 15, having a variable and controllable frequency and voltage/current which is used to power and control motor 10. The heart of a common ASD is the microprocessor which controls the internal switching frequencies of the ASD.

As described in more detail below, in connection with FIGS. 2-5, a control circuit modifies the invertor switching characteristics to control the output frequency and/or voltage of the AC power 15 supplied to the electric motor 10 in order to control the speed of the motor to satisfy the requirements placed on the motor as a result of variations in the process or load 12. If the process or load feedback 26 is utilized, the adjustable speed drive 14 is also made responsive to changes and characteristics of that load. The process or load 12 can be any kind of industrial process or load such as, for example, rotary kilns, cement and aggregate mixers, compressors, escalators or elevators, steel mills and continuous casting drives, textile machinery, conveyers, and essentially any industrial process or equipment requiring a variable mechanical power input which is provided through mechanical connection 11. Adjustable speed drives 14 are most commonly used with the larger electric motors 10. They are widely applied in over 200,000 installations. In many drive applications, such as pumps and fans, it has been common for a variety of reasons to provide a large or oversized motor running at a reduced load capability, which is called throttling, and which greatly increases motor power losses leading to decreased power efficiency.

The adjustable speed drive 14 may be controlled in response to a variety of motor 10 performance characteristics such as input power, torque, speed, stator current, air gap flux, power factor, and/or overall calculated motor efficiency. As the load on motor 10 varies, the adjustable speed drive 14 adjusts the speed of the motor to bring the motor near the desired operating point for that particular motor. Rather than measuring torque directly, one approach is to utilize variables such as the slip frequency and rotor speed of motor 10 and to provide signals representing these variables as the motor feedback signals 24, as described below in connection with the closed loop systems of FIGS. 3-5, although a low cost open loop system may be used as shown in FIG. 2.

Referring next to FIG. 2. FIG. 2 shows an open loop volts/Hertz (volts/Hz) method of speed control of an alternating current induction motor 210 incorporating a fuzzy logic efficiency optimizer 230. The illustrated adjustable speed drive 250 includes three-phase bridge rectifier 252 comprising a parallel circuit of three pairs of diodes connected in series with their junctions connected to the AC line power terminal 216, 218 and 220, which is 220 volts at 60 Hertz AC power. The rectified AC power is provided across the filter capacitor 254 to the pulse width modulator inverter 256, which includes a parallel circuit of three pairs of insulated gate transistors in series, with their junctions connected to the alternating current induction motor 210 input terminals, 264, 266 and 268. The pulse width modulated controller 260 controls the inverter 256 to provide a variable alternating current (AC) voltage input to the stator of induction motor 210 to vary the operation of the induction motor 210 which drives the process or load 212 in response to variations in that load.

The inputs to the fuzzy logic controller or optimizer 230 include the stator current $I_s$ signal 271 and the rotor speed or frequency $\omega_c^*$ command signal 296. A power input $P_i$ signal 288 representing the power provided by power line terminals 216, 218 and 220 is also provided to the fuzzy logic controller or optimizer 230. The output $\Delta V$ signal 240 of the fuzzy logic optimizer 230 is provided to the pulse width modulated converter 260 through the summing circuits 276 and 278. The summing circuit 278 also receives a boost voltage $V_o$ signal 282. When a speed increase is demanded, or load torque on induction motor 210 increases, the motor magnetic flux can be established for the motor 210 to meet the load requirements. The efficiency optimization search provided by the fuzzy logic controller 230 begins when the initial steady-state condition has been attained in a manner described in detail below. In the system of FIG. 2, the speed or speed control loop is open, that is, no speed sensor is required. The speed is controlled by variation of the speed or frequency command signal 296. The stator voltage of the induction motor 210 provided by inverter 256 is proportional to frequency so that the rated air gap flux of the induction motor is maintained. The boost voltage $V_o$ signal 282 is added through adder circuit 278 in the low-frequency/low-speed operating regime to compensate for stator impedance drop resulting from a reduced air gap flux in that operating regime. The acceleration limiter 298 determines and controls the induction motor 210 acceleration profile within the limit of stator current $I_s$ control. Since the voltage/frequency ratio of induction motor 210 determines the motor air gap magnetic flux at any steady-state speed condition, the stator voltage provided by inverter 256 can be changed to establish the desired motor air gap magnetic flux.

This open loop volts/Hz speed control with a fuzzy logic efficiency optimizer is most effective when applied to industry applications that do not require tight or accurate process control, such as automatic speed drives for pumps and blowers. Its advantage is low cost and the absence of a speed detector and speed encoder. However, as compared with the closed loop control systems discussed below, in connection with FIGS. 3–5, the open loop system of FIG. 2 exhibits a more sluggish transient response and coarser speed control, such that it may be potentially unstable for variable inertia loads. In addition, there is a possible reduction of available maximum torque since the fluctuation of the stator supply voltage can cause drift in the induction motor 10 magnetic flux.

Figure 4:
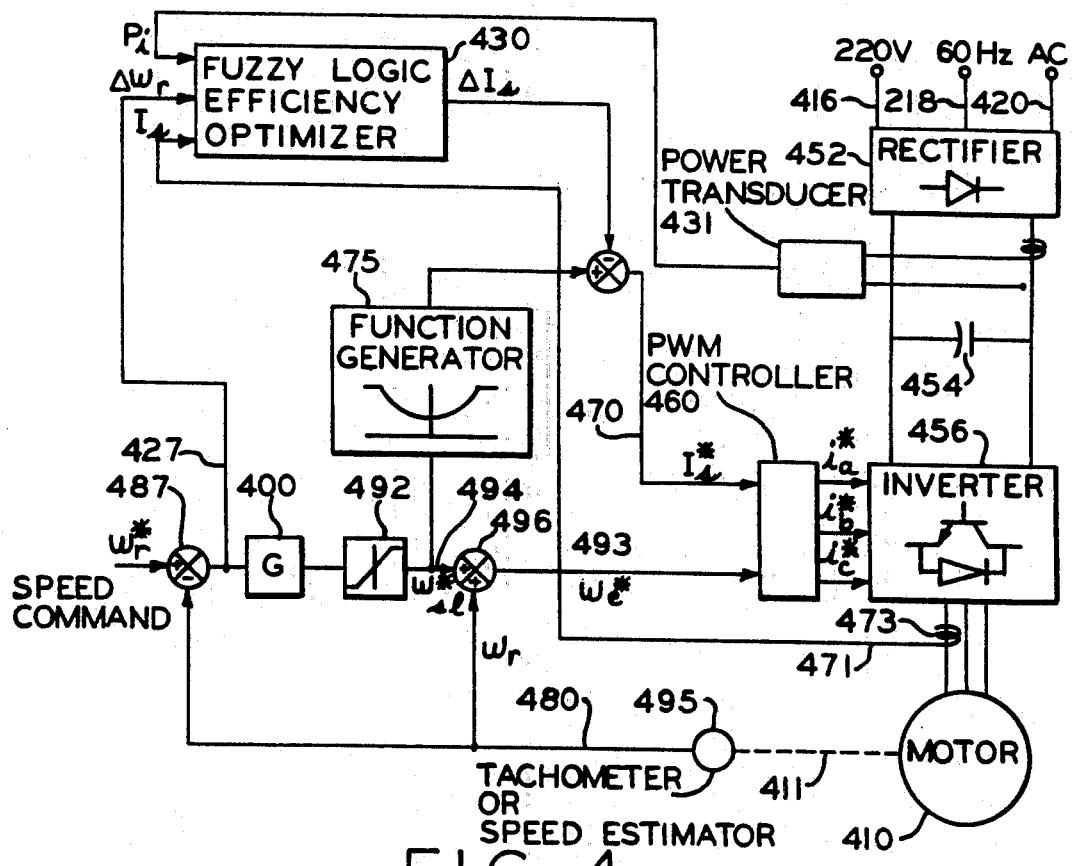

In FIGS. 3–5, the terminal two numbers of most three-number component parts are the same as those used on corresponding or similar components in FIG. 2, with the initial or third number corresponding with the FIG. number. That is, for example, induction motor 210 of FIG. 2, is 310 in FIG. 3, 410 in FIG. 4, and 510 in FIG. 5.

Referring next to FIG. 3. FIG. 3 shows a closed loop automatic speed control system with slip and voltage control. A tachometer 394 mechanically coupled to induction motor 310 by coupling 311 provides the speed feedback $\omega_r$, signal 380, for the closed loop speed control. However, the speed feedback signal may also be provided by a speed estimator requiring no mechanical coupling to the motor. The power output $P_i$ signal 332 of the rectifier 352 is provided by the power transducer 331. The speed loop 391, which includes adder 387 and proportional-integral (PI) controller 300 and limiter 392, generates the slip command $\omega_{sl}^*$ signal 394, which is added with the speed feedback $\omega_r$ signal 380 in adder 396 to generate the frequency command $\omega_c^*$ signal 393. The voltage is slaved with the frequency command through a function generator 375. The change in speed $\Delta\omega_r$ signal 327 is also provided from adder 387 to the fuzzy logic optimizer 330. For changes in speed or torque loading, a nonzero error signal permits the control to establish a higher motor 310 air gap magnetic flux to develop higher induction motor output torque. As with the open loop control system of FIG. 2, the transient response of the control system of FIG. 3 is sluggish and fluctuation in supply voltage 316, 318, 320 can produce drift in the electric motor 310 magnetic flux.

FIG. 4 shows the closed loop speed control with current control. Referring to FIG. 4, a high performance drive is provided using induction motor 410 current control. High performance is realized since induction motor 410 torque is directly related to current. In this system, the stator current control $I_s^*$ signal 470 is slaved with the slip signal $\omega_{sl}^*$ 494 through the function generator 475 so as to maintain constant air-gap magnetic flux in the induction motor 410. The motor 410 current is controlled by the fuzzy logic efficiency optimizer 430 in a manner similar with the voltage reduction described above in connection with FIG. 3. In the control system of FIG. 4, the motor flux drift problem due to supply voltage 416, 418, 420 variation is eliminated.

FIG. 5 shows a closed loop motor speed control with indirect vector control including the power circuit and control elements of a four-quadrant drive system. FIG. 5 shows an indirect vector control arrangement instead of a scalar control arrangement, such as, for example, the scalar current closed loop arrangement of FIG. 4. Referring to FIG. 5, an insulated gate IGBT inverter 556 is shown because of its recent popularity and use in low-to-medium power commercial adjustable speed drives 514. A dynamic brake 521 is incorporated in the DC link to permit electrical braking of induction motor 510. The converter system topology shown is typical of those encountered in existing commercial drives. The inverter 556 is current controlled such that the motor 510 stator currents 564, 566, 568 are regulated by an hysteresis-band PWM technique through the pulse width modulator (PWM) controller 560. In the vector control system, the flux component of current $i_{ds}^*$ signal 545, and torque component of current $i_{qs}^*$ signal 543, are controlled independently as in a direct current (DC) motor. As a result, the drive 514 of FIG. 5 has a DC motor machine-like fast transient response. The speed control loop generates the command for the torque component of motor current $i_{qs}^*$ via the adder 587, proportional-integral compensator 589, and limiter 596. The constant rated rotor flux is controlled by the current $i_{dso}^*$ signal 541. The slip frequency command $\omega_{sl}^*$ signal 595 is generated from the flux component of current $i_{ds}^*$ through the slip gain $K_s = L_m R_r / L_r$. The slip $\omega_{sl}^*$ signal 595 is added with the speed signal in summer 581 to derive the stator frequency $\omega_c$ signal 597 and then the unit vectors $\cos\phi_c$ and $\sin\phi_c$ are generated from it. The vector rotator 531 converts the synchronously rotating frame currents t stationary frame currents which are then converted in phase converter 533 to provide three phase current commands to the PWM controller 560.

In the control system of FIG. 5, motor torque pulsations can arise as the fuzzy logic based optimization search method is deployed when the fuzzy logic efficiency optimizer 530 decrements/increments the motor 510 field current $i_s^*$ signal to reduce/increase the magnetic flux in response to load requirements. The pulsating effect arises because a step change in $i_{qs}$ signal leads to an almost instantaneous change in motor 510 torque, while a corresponding step change in $i_{ds}$ signal takes a longer time to produce a change in motor flux. This is a result of the motor 510 field time constant being larger than the motor armature time constant. This problem can be avoided by a feedforward compensating signal for the step change for the $i_{qs}$ signal. If a linear relationship is assumed between the torque and vector currents ($i_{ds}$, $i_{qs}$), then a step change in $i_{ds}$ due to the fuzzy logic efficiency optimizer should have a corresponding change in $i_{qs}$ to maintain the same torque. A reduction in $i_{ds}$ signal requires an increase in $i_{qs}$ signal, and vice versa, in order to avoid torque fluctuation. The compensating signal should also be applied gradually via a filter with a time constant related to the rotor time constant.

The indirect vector control approach of FIG. 5 performs efficiency optimization control without sacrificing transient response. For many industrial process control applications, transient response of the drives is extremely important. The closed loop performance of this control system is very smooth and the automatic speed drive 514 cannot fall out of stability.

FIG. 6 contains a flow graph or chart of the real-time search method of the operation of the fuzzy logic efficiency control for use with the control systems of FIGS. 2-5. Referring to FIG. 6, the flow chart shows operation where the flux is decremented/ incremented in steps until the measured input power, $P_i$ signal 288 settles to the minimum value. The method accounts for both the machine losses and power supply converter losses; it is independent of system parameters; and the search algorithm can be universally applied to any size or type of automatic speed drive.

The program first tests for the steady-state condition by comparing the speed error $\phi\omega_r$ with a specified tolerance TOL. Next, if a steady-state condition is detected, the program checks to see if this is the first iteration of the search process. If so, the step size, the control variables, and time delay are initialized and the input power $P_i$ measured. After a preset time period, the input power is measured again and compared with the previous value. Based on the sign and magnitude of the input power $P_i$ signal, as well as the value of the last change in the control variable(s), a new value for the control variable(s) is computed using the fuzzy logic efficiency optimizer. Sequential decrementation/ incrementation is continued until the minimal input power $P_i$ level is reached. This is the operating point for best efficiency for the particular load torque and speed conditions. At any time, if the test for steady-state condition fails, rated values for the control variables are imposed and the search is abandoned. In order to maintain sensitivity for the search algorithm near $\Delta P=0$, a minimum value is assigned to $\Delta P$ whenever it falls below a given tolerance.

If a speed increase is demanded or the load torque increases, the flux can be established to full value to get the best transient response. When the new steady-state condition is attained, the fuzzy logic efficiency optimization search begins again to obtain the most energy efficient operating point.

The underlying principles for the fuzzy logic efficiency optimizer 30, 330, 430 and 530 are essentially the same for all four control approaches of FIGS. 2, 3, 4 and 5, respectively. The fuzzy computation of the step size $\Delta$ (which may be one or more control variables $\Delta\omega$, $\Delta V$, $\Delta I_s$, or $\Delta i_{ds}$ and $\Delta i_{qs}$, depending on the control approach) proceeds as follows. The change in step size $\Delta$ is considered a fuzzy variable with values computed according to the measured change in input power, $\Delta P$, and the magnitude and sign of the last or immediately previous change in $\Delta$, which is called $\Delta$old. The generic fuzzy rule relating $\Delta$ to $\Delta P$ and $\Delta$old is:

If $\Delta P$ is A and $\Delta$old is B; then $\Delta$ is C. In a fuzzy logic efficiency optimizer 30, 330, 430 and 530, a fuzzy rule base consisting of several linguistic rules or membership functions is employed. It is desirable with fuzzy logic from a cost and complexity standpoint to use just a few rules. The tables of FIGS. 7A and 7B set forth suitable rule bases useful in a preferred embodiment of the invention. FIG. 7A is a basic or fundamental embodiment of a suitable rule base for use in the fuzzy logic efficiency optimizer. Specific applications of the fuzzy logic may require refinements to this fundamental rule base to match control requirements for desirable operation. FIG. 7B illustrates such a refined rule base. Referring to the tables of FIGS. 7A and 7B, the fuzzy variables N, P, PB, PM, PS, ZE, NS, NM and NB are defined by the linguistic variables negative, positive, positive big, positive medium, positive small, zero, negative small, negative medium, and negative big, respectively. If additional fuzzy variables are desired or required, they can include any of a spectrum of linguistic combinations, such as extra-large positive, extremely small negative, and so forth. Also, additional variables could be constructed for the fuzzy control variable(s). Positive big (or any of the other membership functions) may, of course, vary from system to system in order to tailor the control to the specific system.

Triangular membership functions and the SUP-MIN composition method for inference and centroid defuzzification could be utilized. Other similar membership functions, inference methods, and defuzzification approaches such as the height method could be used. See the aforementioned article "Designing with Fuzzy Logic" by Kevin Self. From the inferred value for $\Delta$, the new value for the controlled variable (V, $I_s$, or $i_{ds}$ and $i_{qs}$) is determined according to:

Variable (new) = Variable (old) + $\Delta$.

The variable or control action can be any appropriate motor control variable such as motor voltage, current, and possibly frequency.

FIG. 8 is a conceptual flow diagram illustrating details of the fuzzy logic controller 30, 230, 330, 430 and 530. The database 100 includes the necessary information regarding the motor parameters or other pertinent data. The rule base 102 includes the type of fuzzy logic relations or basic operations, to provide fuzzy rules, algorithms, and composition for computer language functions such as maximum, minimum, minus, and if-then-else. 104 is the "fuzzification" stage where the process measurements are usually represented as fuzzy singletons, such as big, medium, and small. 106 is the "defuzzification" stage where fuzzy outputs are typically converted to real numbers. The most common procedure for this conversion is the center of area method, much like that used for calculating centroids of various combined areas. The computation unit 110 represents microprocessor functions for interfacing and recalculation. The computation unit 110 may handle complex, real-time computation related to the database and the part of the process or motor system (motor/drive system) that is being mathematically modeled by the fuzzy logic efficiency optimizer.

Adjustable speed drives such as ASD 14 of FIG. 1 incorporating fuzzy logic power efficiency control can be readily retrofitted or added onto existing motors, or incorporated as part of a new motor drive system design and manufacture. This will improve the power efficiency of industrial systems, such as those shown in FIG. 1, and as pointed out above, even small increases in the efficiency possible with existing adjustable speed drives 14 can result in considerable cost savings, and reduction in the use of fossil fuels, coupled with corresponding reductions in toxic emissions resulting from the reduction in the amount of such fossil fuels which are burned.

Unlike most control systems which operate on the principle of control action based upon a specific mathematical model of the drive and motor, including pertinent motor parameters, fuzzy logic involves a decision making process which can handle input data, which are imprecisely stated. This is unlike the precise "on" or "off" control provided, for example, by a thermostat in a temperature control system. The present invention utilizing fuzzy logic can handle imprecise rules or control input information expressed by terms such as ¢big," "medium," and "small."

In the fundamental rule base of FIG. 7A:
1. If $\Delta P$ is P and $\Delta$old is N, then $\Delta = P$.
2. If $\Delta P$ is P and $\Delta$old is P, then $\Delta = N$.
3. If $\Delta P$ is ZE and $\Delta$old is N, then $\Delta = ZE$.
4. If $\Delta P$ is ZE and $\Delta$old is P, then $\Delta = ZE$.
5. If $\Delta P$ is N and $\Delta$old is N, then $\Delta = N$.
6. If $\Delta P$ is N and $\Delta$old is P, then $\Delta = P$.

$\Delta$ is the resultant motor control variable action. This rule base, depending on the application, may not enable the more rapid and variable corrective step magnitude and flexibility of control action possible with the more complex rule base illustrated by FIG. 7B. However, it is less complex and hence less costly in implementation.

The fuzzy logic controller determines if the power input $P_i$ is being controlled or varied in the right direction toward power minimization and whether the control action should be modified as to magnitude and/or direction. The control action continues until the change in input power is zero or does not change from the previous iteration within specified tolerance. Subsequent perturbations in the system 50 will result in subsequent iterations in the control system including the fuzzy logic controller 30 to readjust the electric motor 10 to meet the new load requirements with minimum motor input power.

By way of a general summary of the operation of the present invention, and referring again to FIG. the fuzzy logic controller 30 is used to provide "fine-tuning" or a superimposed power efficiency control signal 40 to the control system including the adjustable speed drive (ASD) 14. The fuzzy logic controller 30 is provided with one or more signals 32 which are responsive to motor operating characteristics to provide a power efficiency control signal to the adjustable speed drive 14. The fuzzy logic controller 30 varies the controlled electrical power 15 applied to the stator of the induction motor 10 by the adjustable speed drive 14 to improve the power efficiency of the motor (over that which would result in the absence of power efficiency control signal 40).

One important advantage of the subject invention which becomes apparent is that the power efficiency control 40 can be provided based on response to only motor 10 operating characteristics provided by motor signal 32. As a result, the fuzzy logic controller 30 can be designed and manufactured as part of the motor system 50 to be essentially independent of the operating characteristics of the process or load 12 which is driven by motor 10 through mechanical connection 11, and still improve the power efficiency of the motor and the motor system. In certain applications of the motor system 50, increased power efficiency may be possible through monitoring and use of the process or load operating characteristics. This may be provided as an option through use of process or load feedback to the fuzzy logic controller 30 which is shown as a dashed line 34 in FIG. 1. The process or load feedback 34 can thus provide control action by fuzzy logic controller 34 which is further directly responsive to operational parameters of the load 12.

After the initial setting of the operating point of the system, by adjusting the control variables (voltage, current and possibly frequency) according to the control system strategies embodied in FIGS. 2-5, the fuzzy logic controller 30 controls these variables, and hence magnetic flux of the electric motor; observes changes in the input power 15 to the motor 1, and makes further changes in sequential steps based on the motor's response to previous changes. Such operation and resultant improvement in efficiency is described in more detail above in connection with FIGS. 2-5.

The power efficiency control signal 40 (see FIG. 1) provided by the fuzzy logic controller 30 to the adjustable speed drive 14 superimposes a power efficiency control onto the system, which studies have indicated provides increased or improved power efficiency which range from around 0.2 percent to, in some instances, greater than 14 percent. The savings through use of one embodiment of the subject invention is estimated to be about three percent, or roughly 1,800 Kilowatt hours, annually for a 10 horsepower motor; 1.7 percent for a 24 horsepower motor; and 1.4 percent for a 100 horsepower motor. Power savings of 1,800 Kilowatts per year for the 10 horsepower motor represents dollar savings of approximately $55-$95 per year. Power savings of 2,500 Kilowatt hours per year for the 25 horsepower motor represents a savings of approximately $75-$130 per year; and power savings of 8,500 Kilowatt hours per year for the 100 horsepower motor represents a dollar savings of approximately $250-$450 per year. While the percentages may not appear large, the saving in power and cost are significant, which would result in a net profit or savings in a relatively small portion of the life of the motor. More important, is the extremely large potential for savings in the burnings of fossil fuels and the reduction in the atmospheric emissions resulting from the burning of fossil fuels as described in detail above.

While the present invention has been described with respect to certain preferred embodiments thereof, it is to be understood that numerous variations in the details of construction, the arrangement and combination of parts, and the type of materials used may be made without departing from the spirit and scope of the invention.

What we claim is:

1. A method of improving the power efficiency of a system including an electric motor with magnetic flux and powered by an adjustable speed drive; an electric motor and a load driven by said electric motor which places variable load demands on said electric motor which said adjustable speed drive responds to by varying the speed of said electric motor and which provides variable operating characteristics such as variations of slip, torque, current, voltage and power in said system comprising:
   providing at least one control signal to said adjustable speed drive which is responsive to variations in said load demands;
   varying the powering of said electric motor in response to said at least one control signal to provide variable speed motor operation to meet the variations in said load demands;
   providing at least one other control signal responsive to variations in at least one of said operating characteristics of said system to a fuzzy logic energy optimization controller;
   developing a power efficiency signal in said fuzzy logic controller utilizing the power input of said electric motor and a fuzzy rule base; and
   applying said power efficiency signal to said adjustable speed drive to modify said magnetic flux and the operation of said electric motor to a speed and power input which substantially meets said demands of said load while improving the power efficiency of said system as compared with that which would result through use and variations of said adjustable speed drive without the modification resulting from the addition of said power efficiency signal.

2. The method of improving power efficiency of the system of claim 1 wherein said at least one other control signal is derived from variations in said operating characteristics of said electric motor, and said power efficiency signal is applied to said adjustable speed drive in steps until substantially minimum motor input power is achieved while meeting said load demands.

3. The method of improving power efficiency of the system of claim 2 including the additional step of operating said fuzzy logic controller substantially in response to the following rule base:

|      | Δ old |    |
|------|-------|-----|
| ΔP   | N     | P  |
| PB   | PB    | NB |
| PM   | PM    | NM |
| PS   | PS    | NS |
| ZE   | ZE    | ZE |
| NS   | NS    | PS |
| NM   | NM    | PM |
| NB   | NB    | PB | wherein:
ΔP is the change in input power to said electric motor;
Δold is the old change in the fuzzy control variable;
N is negative;
P is positive;
PB is positive big;
PM is positive medium;
PS is positive small;
ZE is zero;
NS is negative small;
NM is negative medium; and
NB is negative big; and
incrementally changing the input power to said electric motor until substantially minimum input power is realized while substantially meeting said load demands of said load.

4. The method of improving power efficiency of the system of claim 3 wherein said system includes a signal generator providing a variable signal responsive to the speed of said electric motor, and providing said variable signal to said fuzzy logic energy controller to provide a closed loop speed control system with the signals to which the control action responds is selected from the group consisting of slip and voltage, slip and current and indirect vector quadrature current.

5. The method of improving power efficiency of the system of claim 2 wherein said electric motor is an alternating current induction motor including an air gap between the rotor and stator of the induction motor and magnetic flux in the airgap, and including the additional step of developing said power efficiency signal, substantially in accordance with the following rule base:

|      | Δ old |    |
|------|-------|-----|
| ΔP   | N     | P  |
| PB   | PB    | NB |
| PM   | PM    | NM |
| PS   | PS    | NS |
| ZE   | ZE    | ZE |
| NS   | NS    | PS |
| NM   | NM    | PM |
| NB   | NB    | PB | wherein
ΔP is the change in input power to said electric motor;
Δold is the old (previous) change in the fuzzy control variable;
N is negative;
P is positive;
PB is positive big;
PM is positive medium;
PS is positive small;
ZE is zero;
NS is negative small;
NM is negative medium; and
NB is negative big; and
incrementally changing said input power to said electric motor to vary the motor air gap magnetic flux until substantially minimum input power is realized while substantially meeting said load demands of said load.

6. The method of improving power efficiency of the system of claim 1 including the additional step of operating said fuzzy logic controller substantially in response to the following rule base
   If ΔP is P and Δold is N, then Δ=P.
   If ΔP is P and Δold is P, then Δ=N.
   If ΔP is ZE and Δold is N, then Δ=ZE.
   If ΔP is ZE and Δold is P, then Δ=ZE.
   If ΔP is N and Δold is N, then Δ=N.

If ΔP is N and Δold is P, then Δ=P.
wherein:
ΔP is the change in input power to said electric motor;
Δold is the old (previous) change in the fuzzy control variable;
N is negative;
P is positive;
ZE is zero; and
Δ is the new change in the resultant motor control variable.

7. The method of improving power efficiency of the system of claim 6 wherein said electric motor includes a stator and a stator voltage applied to said stator, and magnetic flux generated by current flow through said electric motor, and said fuzzy logic energy controller periodically samples the input power to said electric motor to determine if said input power is moving toward a minimum value, and changing the stator voltage of said electric motor to control the magnetic flux of said electric motor as a result of said samples, until substantially minimum input power to said electric motor is achieved while substantially satisfying the requirements of said load.

8. The method of improving power efficiency of the system of claim 7 wherein said at least one other control signal in response to variations in the operating characteristics of said load driven by said electric motor.

9. The method of improving power efficiency of the system of claim 7 wherein said at least one other control signal is varies in response to variations in one or more operating characteristics of said motor to control one or more operating characteristics of said motor selected from the group consisting of input power, input voltage, input current, speed and quadrature currents.

10. The method of improving the power efficiency of the system of claim 2 wherein said at least one control signal varies in response to variations in one or more operating characteristics of said load selected from the group consisting of power, torque or speed.

11. The method of improving power efficiency of the system of claim 2 wherein said at least one other control signal varies in response to variations in one or more operating characteristics of said electric motor selected from the group consisting of input power, input voltage, input current, speed and quadrature currents.

12. A method of retrofitting to improve the power efficiency of an existing system including an electromotor with magnetic flux and controlled by an adjustable speed drive and a load driven by said electric motor and placing variable load demands on said electric motor which said adjustable speed drive responds to by varying the speed of said electric motor and which provides variable operating characteristics such as variations of slip, torque, current, voltage and power in said system in which at least one control signal is provided to the adjustable speed drive responsive to variations in said variable load demands on said electric motor, and the powering of said electric motor is varied in response to said at least one control signal to provide power to meet the variations in the load demands comprising:
adding a fuzzy logic energy optimization controller to said existing system;
providing at least one other control signal responsive to variations in at least one said operating characteristics of said system to a said fuzzy logic optimization controller;
developing a power efficiency signal in said fuzzy logic energy optimization controller utilizing the power input of said electric motor and a fuzzy rule base;
applying said power efficiency signal to said adjustable speed drive to modify said magnetic flux and the operation of said electric motor to a speed and power input which substantially meets said demands of said load while improving the power efficiency of said system as compared with that which would result prior to adding said fuzzy logic energy optimization controller and said power efficiency signal.

13. The method of improving power efficiency of the system of claim 12 including the additional step of operating said fuzzy logic controller substantially in response to the following rule base:

| ΔP | Δ old | |
|---|---|---|
| | N | P |
| P | PB | NB |
| PM | PM | NM |
| PS | PS | NS |
| ZE | ZE | ZE |
| NS | NS | PS |
| NM | NM | PM |
| N | NB | PB | wherein
ΔP is the change in input power to said electric motor;
Δold is the old (previous) change in the fuzzy control variable;
N is negative;
P is positive;
PB is positive big;
PM is positive medium;
PS is positive small;
ZE is zero;
NS is negative small;
NM is negative medium; and
NB is negative big; and incrementally changing the input power to said electric motor until substantially minimum input power is realized while substantially meeting the load demands of said load.

14. The method of improving power efficiency of the system of claim 12 including the additional step of operating said fuzzy logic controller substantially in response to the following rule base:
If ΔP is P and Δold is N, then Δ=P.
If ΔP is P and Δold is P, then Δ=N.
If ΔP is ZE and Δold is N, then Δ=ZE.
If ΔP is ZE and Δold is P, then Δ=ZE.
If ΔP is N and Δold is N, then Δ=N.
wherein:
ΔP is the change in input power to said electric motor;
Δold is the old (previous) change in the fuzzy control variable;
N is negative;
P is positive;
ZE is zero; and
Δ is the new change in the resultant motor control variable.

15. In a motor control system including an electric motor with magnetic flux driving a load and placing variable load demands on said electric motor and providing variable operating characteristics such as variations of slip, torque, current, voltage and power in said system to which said adjustable speed drive responds by variations in the speed of said electric motor comprising:
  an adjustable speed drive to vary the speed of said electric motor is response to variations in said load;
  a fuzzy logic energy optimization controller to vary the powering of said adjustable speed drive in response to variations in at least one of said operating characteristics, wherein said fuzzy logic energy optimization controller is operated in response to a fuzzy rule base;
  said adjustable speed drive further varying the magnetic flux of said motor in response to said fuzzy logic energy optimization controller to improve the power efficiency of said electric motor by optimizing the power input to said electric motor.

16. The motor control system of claim 15 wherein said electric motor is an alternating current induction motor with an airgap between the rotor and stator thereof, the operating of which is controlled by variation of the voltage applied thereto by said adjustable speed drive to vary the magnetic flux in said airgap.

17. The motor controller system of claim 14 wherein said fuzzy logic controller includes a rule base to control the operation thereof, said rule base comprising:

|      | Δ old |    |
|------|-------|----|
| Δ P  | N     | P  |
| PB   | PB    | NB |
| PM   | PM    | NM |
| PS   | PS    | NS |
| ZE   | ZE    | ZE |
| NS   | NS    | PS |
| NM   | NM    | PM |
| NB   | NB    | PB | wherein the elements of said rule base are substantially as follows:
  ΔP is the change in input power to said electric motor;
  Δold is the old (previous) change in the fuzzy control variable;
  N is negative;
  P is positive;
  PB is positive big;
  PM is positive medium;
  PS is positive small;
  ZE is zero;
  NS is negative small;
  NM is negative medium; and
  NB is negative big; and whereby incremental changes in input power to said electric motor may be realized until substantially minimum motor input power is realized.

18. The motor control system of claim 16 wherein said fuzzy logic controller provides a signal to said adjustable speed drive to control the input selected from the current and the voltage supplied to the stator of said alternating current induction motor.

19. The motor control system of claim 17 wherein said adjustable speed drive and said fuzzy logic controller include solid state circuitry.

20. The method of reducing the input power required for the motor of claim 2 wherein said fuzzy logic controller also varies the operation of said automatic speed drive in response to variations in said operating characteristics of said load.

21. The motor control system of claim 20 wherein said automatic speed drive provides a frequency control signal to control the frequency of the power supplied to said electric motor, and in addition said automatic speed drive provides a voltage control signal to control the voltage supplied to said electric motor.

22. The method of reducing the input power required for the motor of claim 21 wherein said electric motor is an alternating current induction motor with magnetic flux generated in an air gap, the operation of said electric motor operational parameters selected from the group consisting of the frequency and stator voltage applied thereto by said adjustable speed drive to vary in steps the air gap magnetic flux in said electric motor.

23. The motor control system of claim 15 wherein said fuzzy logic controller includes a rule base to control the operation thereof, said rule base comprising:
  If ΔP is P and Δold is N, then Δ=P.
  If ΔP is P and Δold is P, then Δ=N.
  If ΔP is ZE and Δold is N, then Δ=ZE.
  If ΔP is ZE and Δold is P, then Δ=ZE.
  If ΔP is N and Δold is N, then Δ=N.
  If ΔP is N and Δold is P, then Δ=P.
wherein
  ΔP is the change in input power to said electric motor;
  Δold is the old (previous) change in the fuzzy control variable;
  N is negative;
  P is positive;
  ZE is zero; and
  Δ is the new change in the resultant motor control variable.

24. The motor control system of claim 23 wherein said fuzzy logic controller provides a signal to said adjustable speed drive to vary the voltage supplied to the stator of said electric motor in response to electric power efficiency considerations.

25. The motor control system of claim 23 wherein said adjustable speed drive varies the frequency of the power supplied to said electric motor, and in addition varies the voltage supplied to said electric motor.

26. The motor control system of claim 24 wherein said adjustable speed drive and said fuzzy logic controller include solid state circuitry.

27. The motor control system of claim 16 including a tachometer connected to said induction motor for rotation in connection therewith to provide a speed signal responsive to the speed of said induction motor, and providing said speed signal to said fuzzy logic controller to provide a closed loop system with improved power efficiency.

28. A method of improving the power efficiency of a system including an electric motor including a stator and air gap with magnetic flux and powered by an adjustable speed drive and a load driven by said electric motor and placing variable load demands on said electric motor which are responded to by said adjustable speed drive varying the speed of said electric motor with variable operating characteristics such as current voltage and power in said system comprising:
  providing at least one control signal to said adjustable speed drive which is responsive to variations in the demands of said load on said electric motor;
  varying the powering and resultant operation of said electric motor in response to said at least one control signal to meet the variations in load demands;

providing at least one other control signal responsive to variations in at least one of said operating characteristics of said system to a fuzzy logic energy controller.

developing a power efficiency signal in said fuzzy logic energy controller utilizing a fuzzy rule base; and applying said power efficiency signal to said adjustable speed drive to modify said magnetic flux and the operation of said electric motor to a speed and power input which substantially meets said demands of said load while improving the power efficiency of said system as compared with that which would result through use of said adjustable speed drive without the addition of said power efficiency signal;

deriving said at least one another control signal from variations in at least one of said operating characteristics of said electric motor;

applying said power efficiency signal to said adjustable speed drive in steps until substantially minimum motor input power is achieved while meeting load demands;

operating said fuzzy logic energy controller substantially in response to the following fuzzy rule base;

|  | Δ old | |
|---|---|---|
| Δ P | N | P |
| P | P | N |
| ZE | ZE | ZE |
| N | N | P | wherein:

ΔP is the change in input power to said electric motor;

Δold is the old (previous) change in the fuzzy control variable;

N is negative;

P is positive;

ZE is zero;

N is negative.

29. The method of improving power efficiency of the system of claim 28 wherein said system includes a signal generator providing a variable signal which varies in response to a variable of said electric motor selected from the current, the voltage and the speed of said electric motor, and providing said variable signal to said fuzzy logic controller to provide a closed loop scalar control system.

30. The method of improving power efficiency of the system of claim 28 wherein said system includes a signal generator providing a variable signal responsive to a variable of said electric motor selected from the current, the voltage and the speed of said electric motor, and providing said variable signal to said fuzzy logic controller to provide an open loop scalar control system.

31. The method of improving power efficiency of the system of claim 29 wherein said fuzzy logic controller provides a signal to said adjustable speed drive to control the input selected from the current and the voltage supplied to the stator of said electric motor.

32. The method of improving power efficiency of the motor control system of claim 30 wherein said fuzzy logic controller provides a signal to said adjustable speed drive to control the input selected from the current and the voltage supplied to the stator of said electric motor.

33. The method of improving power efficiency of the system of claim 28 wherein said system includes a signal generator providing a variable signal responsive to a variable of said electric motor selected from the current, the voltage and the speed of said electric motor, and providing said variable signal to said fuzzy logic controller to provide a closed loop vector control system.

34. The method of improving power efficiency of the system of claim 28 wherein said system includes a signal generator providing a variable signal which varies in response to a variable of said electric motor selected from the current, the voltage and the speed of said electric motor, and providing said variable signal to said fuzzy logic controller to provide an open loop vector control system.

35. The motor control system of claim 33 wherein said fuzzy logic controller provides a signal to said adjustable speed drive selected from signals which vary in response to the current and the voltage supplied to the stator of said electric motor.

36. The motor control system of claim 34 wherein said fuzzy logic controller provides a signal to said adjustable speed drive selected from signals which vary in response to the current and the voltage supplied to the stator of said electric motor.

37. The method of improving power efficiency of the system of claim 28 wherein said fuzzy logic controller periodically samples the input power to said electric motor to determine if said input power is moving toward a minimum value, and changing the stator voltage of said electric motor to control the magnetic flux of said electric motor as a result of said samples, until substantially minimum input power to said electric motor is achieved while substantially satisfying the requirements of said load.

38. The method of improving power efficiency of the system of claim 37 wherein said at least one other control signal is further derived from variations in the operating characteristics of said load driven by said electric motor.

39. The method of improving power efficiency of the system of claim 38 wherein said at least one other control signal varies in response to variations in one or more operating characteristics of said motor to control one or more operating characteristics of said motor selected from the group consisting of input power, input voltage, input current, speed and quadrature currents.

40. The method of improving power efficiency of the system of claim 37 wherein at least one other control signal varies in response to variations in one or more operating characteristics of said electric motor selected from the group consisting of input power, input voltage, input current, speed and quadrature currents.

* * * * *